United States Patent [19]

Rasigade et al.

[11] 4,127,814

[45] Nov. 28, 1978

[54] DETECTOR FOR DISCRIMINATING BETWEEN TWO METALS ON A RELATIVELY MOVING MEMBER BY BEING POSITIONED AT A DISTANCE WHERE IT SENSES ONE BUT NOT THE OTHER

[75] Inventors: Hervé P. Rasigade; François L. L'Henoret, both of Compiegne, France

[73] Assignee: POCLAIN, Societe Anonyme de droit francais, Le-Plessis-Belleville, France

[21] Appl. No.: 648,023

[22] Filed: Jan. 12, 1976

[30] Foreign Application Priority Data

Jan. 15, 1975 [FR] France .................. 75 01154

[51] Int. Cl.² ............................................ G01R 33/12
[52] U.S. Cl. .................................................. 324/208
[58] Field of Search ............. 324/34 R, 34 D, 34 PS, 324/41, 207, 208

[56] References Cited

U.S. PATENT DOCUMENTS

| 2,628,539 | 2/1953 | Neergaard | 324/34 PS |
| 2,914,756 | 11/1959 | Heidenhain et al. | 324/34 PS |
| 3,176,241 | 3/1965 | Hogan et al. | 324/41 |
| 3,473,111 | 10/1969 | Leersnijder et al. | 324/41 |

FOREIGN PATENT DOCUMENTS 614,229 12/1960 Italy .................. 324/34 PS

OTHER PUBLICATIONS

La Commande Electronique; Ministop Detector de Proximite Electronique; Dossier Techniqu de l'Electrict; Panelle Techniques, Z-Az; 2nd Ed., Apr. 1973.

Primary Examiner—Robert J. Corcoran
Attorney, Agent, or Firm—Lewis H. Eslinger

[57] ABSTRACT

This invention relates to a detector for detecting the relative position of two members, said detector being constituted by a reference mark made on a first member, by a detection member securely connected to the second member and influenced by the coincidence of position of the reference mark with itself, corresponding to said relative position. The reference mark is of substantially punctual type, distinct from other possible reference marks and separated from said other reference marks. One application of the present invention is the detection of the end of stroke of the piston of a jack.

7 Claims, 9 Drawing Figures

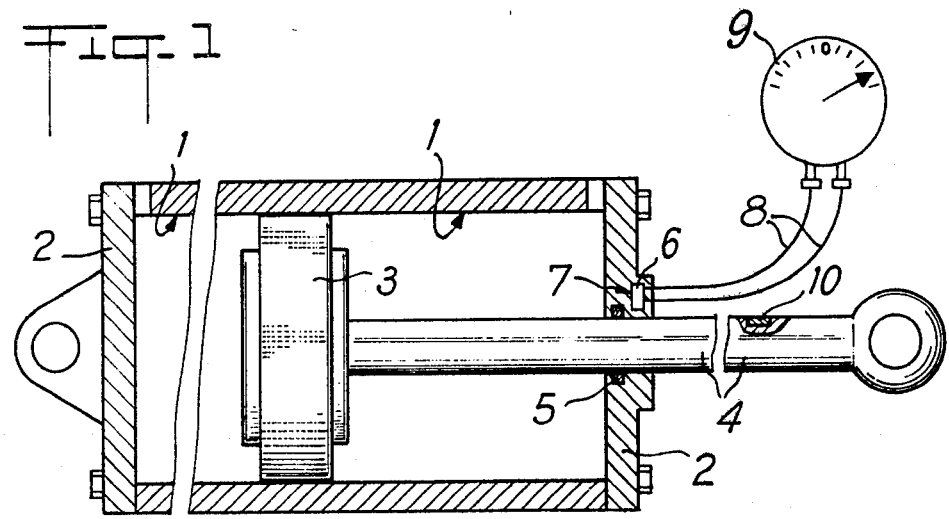
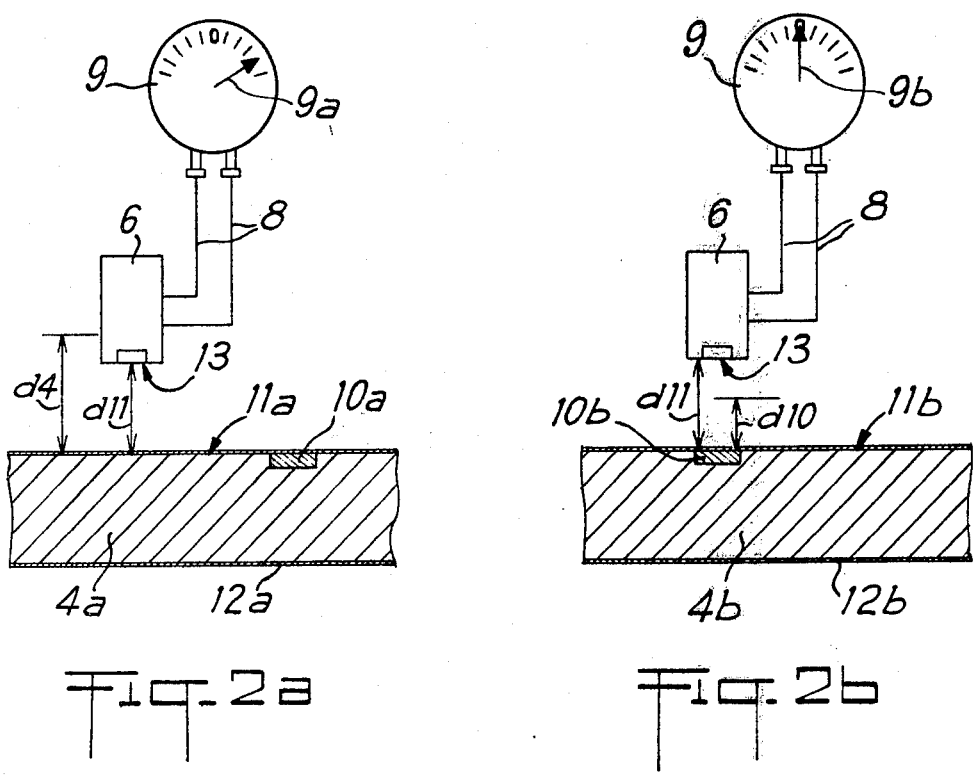

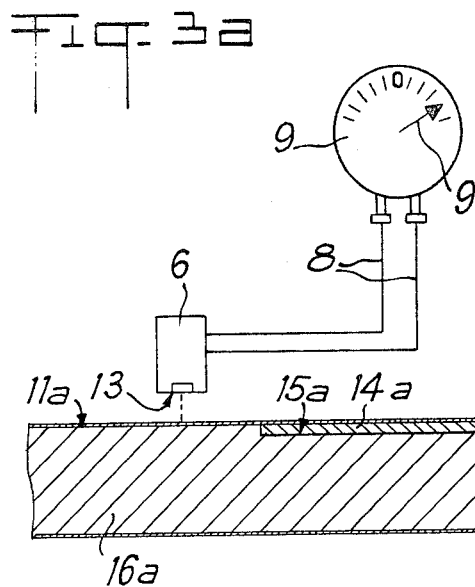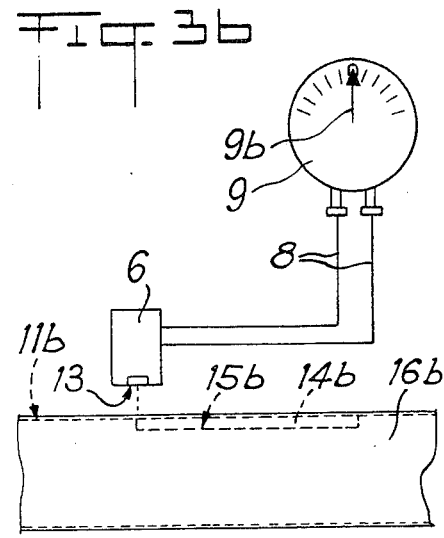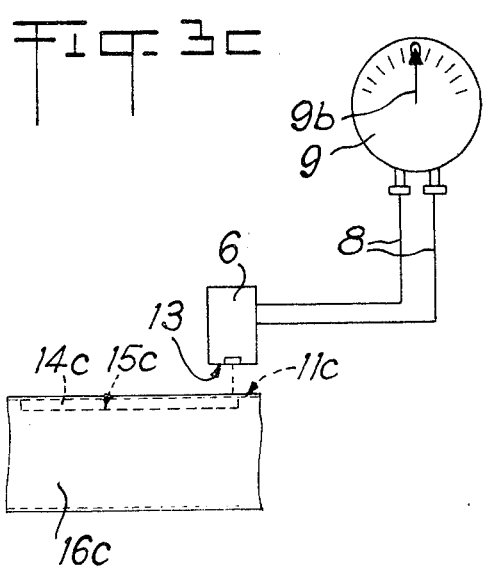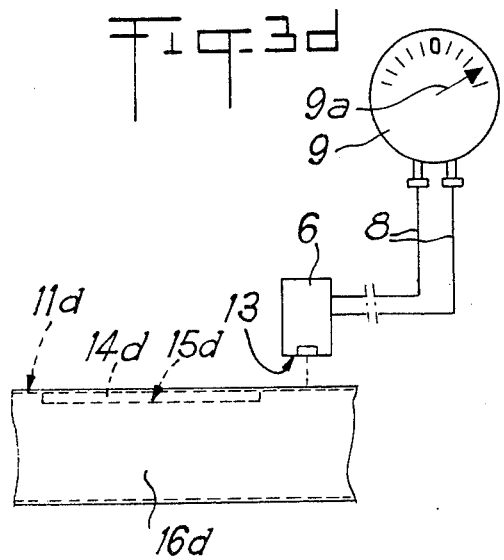

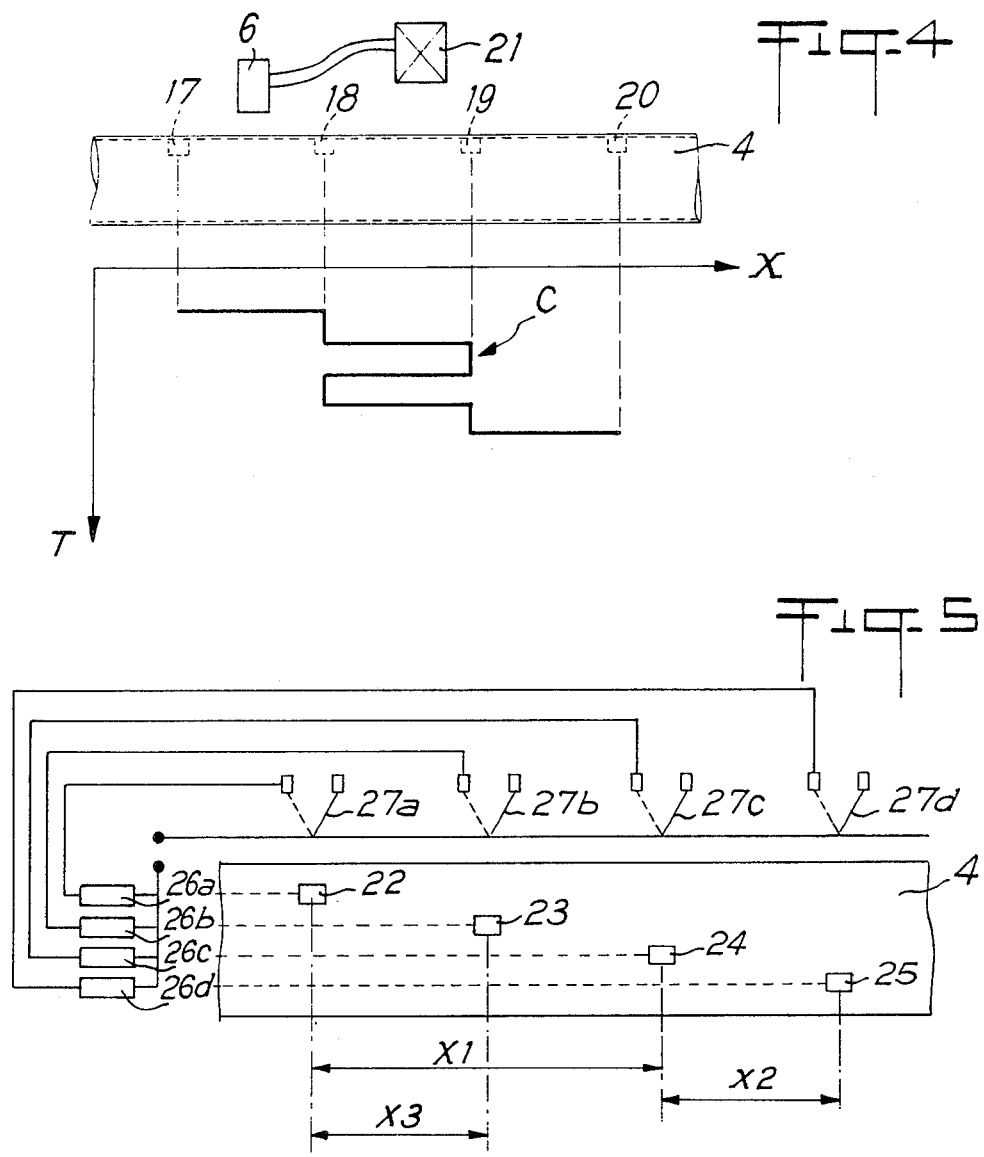

...

DETECTOR FOR DISCRIMINATING BETWEEN TWO METALS ON A RELATIVELY MOVING MEMBER BY BEING POSITIONED AT A DISTANCE WHERE IT SENSES ONE BUT NOT THE OTHER

The present invention relates to an apparatus for detecting the relative position of two members.

A method of detecting the relative position of two members is already known, according to which a detector is fixed to one of the members and detects the thickness, which varies as a function of the position, of a coating covering the other member.

According to a certain known art, the coating is continuous and covers, by a layer defined by an inner concial face and by an outer cylindrical face, the piston rod of a jack.

In view of the sensitivity of the detector, and of the relative variation in distance from this detector to the outer surface of the coating, it is necessary, in order to obtain reliable values of the relative position, at least when this is possible as in the case of the rod of a jack, to compensate for the variation in distance on one side by the plurality of measurements of opposite sides, then to take into account the various data by a complicated and expensive electronic device.

This is naturally due to the continuous character of the measurement. Now, certain applications do not require continuity, and for such applications, the invention proposes a relative position detector which is much simpler than the detectors mentioned hereinabove.

It is therefore an object of the invention to provide an apparatus for detecting at least one relative position of two members which are movable with respect to each other, said detector being constituted by at least one reference mark made on the structure of a first of the two members, by a member for detecting the or each reference mark, secured to the second of said two members and influenced by the or each coincidence of position of the or each reference mark with itself, corresponding to the or each relative position, each reference mark is of substantially punctual type, distinct from other possible reference marks and separated from said other reference marks.

The detection member is disposed at a distance from the outer face of the first member which is shorter than the distance of detection of the material of said first member and greater than the distance of detection of the material of each reference mark.

The following arrangements are preferably adopted:

each reference mark is disposed in the first member and is flush with the outer face of said first member, said outer face and said reference mark are coated with a layer of a surface coating, such as a layer of chromium, which has no effect on the detection by the detection member.

It is sometimes advantageous if the reference mark is constituted by one of the ends of a bar, which extends in the direction of relative displacement of two members.

Finally, the detection member is often constituted by an induction pick-up.

The invention will be more readily understood on reading the following description with reference to the accompanying drawings in which:

FIG. 1 is an axial section through a jack provided with a detector according to the invention;

FIGS. 2a and 2b schematically show an arrangement according to the invention, in two distinct configurations of the reference mark to be detected;

FIGS. 3a, 3b, 3c, 3d schematically show another arrangement according to the invention, in four distinct configurations of the reference mark;

FIGS. 4 and 5 schematically show two applications of a detector according to the invention.

Referring now to the drawings, FIG. 1 shows a jack which is constituted by a cylinder 1, defined by two screwed-down ends 2 in which a piston 3 is mounted to slide. A rod 4 of the piston is fast with the piston 3 and passes, in sealed manner, through one of the ends 2, a seal 5 being interposed between said rod and said end.

A detector 6 is contained in a cavity 7 made in the end through which the piston rod 4 passes and is connected, by electrically conductive wires 8, to the dial 9 of a galvanometer. In addition, a reference mark 10 is made in the metal of the piston rod 4, near the end thereof. This reference mark is detectable by the detector 6.

Referring to FIGS. 2a and 2b, the rod is noted to be disposed at 4a, 4b, respectively, with respect to the detector 6. A reference mark 10a, 10b is made in this rod, which is flush with the cylindrical face 11a, 11b thereof. In addition, a protective chromium layer 12a, 12b covers the face 11a, 11b as well as said reference mark and has no effect on the detection made by the detector 6. The sensitive face 13 of the detector 6 is disposed at a distance $d11$ from the closest part of the face 11a, 11b and therefore from reference mark 10a, 10b. This distance $d11$ is on the one hand greater than the maximum distance $d10$ of detection of the reference mark 10a, 10b, on the other hand smaller than the distance $d4$ of detection of the material of the rod 4a, 4b. On this subject, it should be noted that, when the reference mark 10b is disposed between the outer face of the rod, disposed at 11b, and the sensitive face 13, it is distance $d10$ which must be taken into consideration. In the contrary case (FIG. 2a), it is distance $d4$ which must be considered. The needle of the dial 9 is shifted to 9a in FIG. 2a and is free from deviation and disposed at zero, at 9b, in FIG. 2b.

Referring now to FIGS. 3a, 3b, 3c and 3d, the reference mark is constituted by a bar 14a, 14b, 14c, 14d, introduced into a longitudinal notch 15a, 15b, 15c, 15d made in the rod 16a, 16b, 16c, 16d which is movable with respect to the detector 6, respectively. The needle of the dial 9 is either shifted to 9a in FIGS. 3a and 3d, whilst the sensitive face 13 of the detector 6 is located straight above the face 11a, 11b, 11c, 11d of the rod, without interposition of the reference mark, or not shifted (9b) in FIGS. 3b and 3c, whilst said sensitive face 13 is located straight above the reference mark 14b, 14c, in the present case one or the other of the ends of this reference mark.

With reference to FIG. 4, there are four reference marks 17, 18, 19, 20 on the rod 4. These reference marks influence the detector 6 which is connected to a device 21 for controlling the displacement of the rod 4. This device 21, upon passage of each reference mark straight below the detector 6, controls the following displacement, so that the curve C representing the displacement X as a function of time T, is, in the example described, the one shown in FIG. 4.

In FIG. 5, the rod 4 comprises four reference marks 22, 23, 24, 25, each detectable by a particular detector 26a, 26b, 26c, 26d. With each detector is associated a double-throw switch 27a, 27b, 27c, 27d making it possible to switch on, or, on the contrary, neutralise the action of the corresponding detector. In this way, the displacements indicated between two reference marks correspond to the switching on of the following groups of two detectors:

Detectors in service: 26a and 26c; 26c and 26d; 26a and 26b

Corresponding displacement: $X_1$; $X_2$; $X_3$

Reference marks in question: 22 and 24; 24 and 25; 22 and 23

Moreover, it is obvious that, as variants, several detectors could cooperate with a single reference mark, their being disposed, in that case, on the path of said reference mark and spaced from one another, each detector being associated with a switch.

The advantages of the devices described will now be set forth.

Fundamentally, it is understood on reading FIGS. 2a and 2b, that the position 4b of the rod 4 is detected when the distance d11 is greater than the distance d10 and that at the same moment the reference mark 10b is disposed straight below the sensitive face 13. When on the contrary the rod is located at 4a, the distance d11 is then shorter than the distance of detection of the rod; this detection is effected, the needle being shifted to 9a.

Detection functions by "all or nothing" and is finally not sensitive to a variation in distance between the sensitive face 13 and the face 11a or 11b of the rod, provided that this difference is sufficiently limited for d11 to remain between d4 and d10. If the rod 4a, 4b is made of steel and reference mark 10a, 10b made of bronze, d4 and d10 have very different values, which make it possible to tolerate already considerable variations of d11. A complicated electronic correction device is therefore not necessary for detecting the desired position with all the desired accuracy.

In this way, the end of stroke of the piston 3 of FIG. 1 is detected very simply and certainly by the coincidence of reference mark 10 and the detector 6.

When the reference mark is constituted by an elongated bar, the position signal is then constituted by the coincidence of one of the ends of the bar 14b or 14c with the detector 6.

Naturally, it is understood that a control device 21 (FIG. 4) makes it possible to control the displacement between two successive reference marks, as a function of time. In this way, the equivalent of "cams" of various shapes is realised simply.

Similarly, the selection made by the switches of FIG. 5 enables the value and position of the useful stroke $X_1$, $X_2$ or $X_3$ of a mobile member 4 to be instantaneously adjusted at the same time.

It may also be noted that the detection which is made, shown schematically by the move of needle 9a, may be used for any desired application and, furthermore, enables a power circuit to be directly controlled without having to resort to the use of an amplifier. Machining is simplified by these various characteristics.

What is claimed is:

1. A detector for detecting at least one relative position of two members which are movable with respect to each other, said detector comprising at least one reference mark made on the structure of a first of the two members, said first of the two members being formed of steel, said reference mark being of substantially punctual type and formed of bronze means capable of detecting the material of said first member within a first distance from the member and the material of said mark only within a second distance from the member which is smaller than said first distance, said detecting means being secured to the second of these two members and influenced by the coincidence of position of the reference mark with the detecting means, said detecting means being disposed at a distance from the outer face of the first member which is shorter than the distance of the detection of the material of said first member and greater than the distance of detection of the material of said reference mark.

2. A detector as claimed in claim 1, including a plurality of reference marks with each reference mark being disposed in the first member flush with the outer face thereof.

3. A detector as claimed in claim 2, wherein said outer face and said reference marks are coated with a layer of a surface coating which has no effect on the detection by the detection member.

4. A detector as claimed in claim 1, wherein the reference mark is constituted by one of the ends of a bar which extends in the direction of relative displacement of the two members.

5. A detector as claimed in claim 1, wherein the detection means is constituted by an induction pick-up.

6. A detector as defined in claim 2 wherein each of said reference marks is distinct from the other reference marks on said first member and separated from said other reference marks on said first member.

7. A detector as defined in claim 3 wherein said surface coating comprises a layer of chromium.

* * * * *